United States Patent Office 3,336,140
Patented Aug. 15, 1967

3,336,140
OLEAGINOUS COMPOSITION AND METHOD
FOR MAKING SAME
Brinton Marlo Dirks and Gunther M. Nakel, Springfield Township, Ohio, assignors to The Procter & Gamble Company, Cincinnati, Ohio, a corporation of Ohio
No Drawing. Filed Mar. 18, 1964, Ser. No. 352,972
5 Claims. (Cl. 99—140)

ABSTRACT OF THE DISCLOSURE

Preparing a flavored oil or fat by adding the reaction product of piperidine, proline and dextrose made by (1) reacting piperidine with dextrose to form a syrupy solution, (2) adding an acidic catalyst, e.g., acetic acid, and (3) reacting with proline. The flavored fat or oil imparts crusty flavor to baked products.

This invention relates to oleaginous compositions containing a reaction product of piperidine, proline and dextrose (hereinafter the reaction product will be referred to as PPD) as a flavoring additive. This invention further relates to a method for preparing oleaginous compositions containing PPD.

The term "oleaginous compositions" is used herein in its broadest sense to include any natural or artificially produced edible material of a fatty or oily nature; it includes fats and oils derived from naturally occurring glycerine oils such as cottonseed oil, soybean oil, peanut oil, rapeseed oil, sesame seed oil, sunflower seed oil and wallflower seed oil. The oleaginous composition can vary in consistency from liquid to plastic and may include highly hydrogenated fatty triglycerides. For a liquid shortening a liquid glyceride can contain up to about 10% substantially completely hydrogenated triglycerides. A liquid shortening suitable for use in this invention is disclosed in Andre and Going, U.S. Patent No. 2,815,286 granted Dec. 3, 1957. For a plastic shortening a glyceride mixture can contain from about 10% to about 20% of substantially completely hydrogenated fatty triglycerides. A plastic shortening suitable for use in this invention is disclosed in Coith, Richardson and Votaw, U.S. Patent No. 2,132,393, granted Oct. 11, 1938. The oleaginous compositions can contain minor amounts of conventional antioxidants and emulsifiers. The term "oleaginous compositions" is also used herein to include margarine.

Oleaginous compositions along with flour, salt, sugar, milk solids, water and yeast can be used in the preparation of bakery products, such as bread, rolls and buns. Bread is generally prepared from these ingredients by one of three methods: the straight dough method, the sponge dough method and by continuous processing. In the straight dough method all the conventional ingredients are mixed together in a single batch until the dough is developed. Fermentation starts during mixing and continues until heat is applied during baking. The sponge dough method involves mixing part of the flour, water, sugar and yeast to form a sponge which is then fermented. After the fermentation is complete, the sponge is mixed with the remaining flour and other ingredients for panning, proofing, nad baking. The practice of making commercial bread by the straight dough and sponge dough methods has been replaced, in many instances, by an absolutely continuous process which is generally described by Baker in U.S. Patent 2,953,460, granted Sept. 20, 1960. The Baker process is essentially a two stage mixing operation: In the first mixing stage, the dough ingredients including a conventional brew are thoroughly blended in a premixer which fully wets and combines all of the dough ingredients to yield a uniformly mixed dough which is essentially undeveloped; in the second mixing stage the dough ingredients are developed in a high speed developer into a dough suitable for baking, after proofing, without further mixing or working.

Dry bakery product mixes, such as bread, roll and bun mixes, are available for home use. These dry mixes require only the addition of a liquid and baking to form a bakery product. These mixes contain no yeast and depend on chemical leavening agents, such as delta lactone gluconic acid together with sodium bicarbonate, for their ability to rise during baking.

A significantly enhanced crusty flavor is being sought for bakery products, particularly for bread produced by continuous processing and for chemically-leavened bakery products. The term "crusty-flavor" is used herein to denote a flavor reminiscent of toasted cereal products, that is, a nutty cracker-like, slightly bitter, caramelized flavor.

Bakery product flavor is believed to result from the fermentation process where yeast is used in the bakery product preparation and from browning reactions involving the reaction of alpha amino acids present in the flour protein with reducing sugars. Matz, S. A., Bakery Technology and Engineering, 57–61 (The Avi Publishing Co., Inc. Westport, Conn., 1960), lists some of the compounds repeatedly detected in oven condensate, bread crumb, bread crust and fermented solutions. Moriarty, U.S. Patent 3,060,031, granted Oct. 23, 1962, discloses the addition to chemically-leavened bread of the reaction products formed by reacting sugar with at least one amino acid selected from the group of leucine, arginine and histidine. Johnson, J. A. and Miller, B. S., The Bakers' Digest, 52–58 (October 1961) in an article entitled, "Browning of Baked Products," disclose a number of amino acid-dextrose reaction products, including a reaction product of proline and dextrose, and compare the ultra violet absorption curves of these reaction products with that of bread crust extract. Wiseblatt, L. and Zoumut, H. F., Cereal Chemistry 40, No. 2, 162–169 (March 1963) in an article entitled "Isolation, Origin, and Synthesis of a Bread Flavor Constituent" compare substances with a crackery aroma (a) isolated from fermented liquid brews, (b) isolated from dried bread and (c) resulting from a reaction of dihydroxyacetone and proline and try to show that they are identical. Although these references illustrate a number of the diverse approaches to the source of bread flavor, none teaches or suggests a method for improving the flavor of bread or of bakery products, generally.

It is an object of the present invention to provide an oleaginous composition containing a flavoring additive with high flavor carryover for use in supplying a significantly enhanced crusty flavor to bland or lightly flavored bakery products.

It is a further object of the present invention to provide a method for imparting high flavor carryover characteristics to oleaginous compositions.

It has been found that oleaginous compositions containing PPD impart a significantly enhanced crusty flavor when used in the preparation of bakery products.

PPD can be prepared in a three-step reaction comprising the steps of (1) reacting piperidine and dextrose, (2) adding an acidic catalyst to the piperidine-dextrose reaction product and allowing further reaction and (3) reacting the catalytically-formed reaction product with proline. Piperidine, dextrose and proline can be purchased commercially.

In the first step of PPD synthesis, generally set forth above, piperidine is reacted with dextrose, either in the presence of a solvent or with no solvent present. If a solvent is present, the reaction can be carried out at the reflux temperature of the solvent. If no solvent is present, the boiling point of piperidine, 223° F., is the limiting reaction temperature. In any case the reaction should be carried out at less than about 250° F. in order to insure that the dextrose will not become substantially caramelized. Generally, reaction temperatures range from about 140° F. to about 250° F. This reaction is carried out completely in a period of time ranging from 1.5 hours to 2.5 hours and a syrupy solution is obtained. If a solvent is used in which the dextrose is not substantially soluble and there is a molar excess of piperidine over dextrose, this reaction is apparently complete when the solid dextrose disappears from view.

Suitable solvents for use in the first step of the synthesis include ethanol, glycerine, propylene glycol, triacetin (glyceryl triacetate) and acetic acid. Ethanol is the preferred solvent.

In the second step of PPD synthesis an acidic catalyst is added to the hot syrupy solution resulting from the first step over a period of time ranging from 15 minutes to 45 minutes with continuous stirring. Heating at temperatures generally similar to those in step one, for about one-half hour after the addition of the catalyst, will insure practical completion of the reaction. A cherry red tinged solution results.

Suitable catalysts for use in the second step of PPD synthesis include acetic, phosphoric, boric, malonic, propionic, benzoic, succinic, citric, glutamic, tartaric and fumaric acids.

In the third step of PPD synthesis, proline is reacted with the cherry red tinged solution resulting from step (2) at a temperature generally similar to those in step (1) for about one to two hours to yield PPD.

The permissible variations in the amounts of reactants and catalyst to be used in the above synthesis are set forth in the following table:

| Ingredient | Range of Molar Ratios Ingredient: Dextrose | Preferred Molar Ratios Ingredient: Dextrose |
| --- | --- | --- |
| Piperidine | 1:4 to 2:1 | 2:1. |
| Proline | 1:10 to 1.5:1 | 0.7:1. |
| Catalyst | 1:10 to 2.5:1 | 1.2 moles acetic acid:1 mole dextrose. |

PPD is a complex mixture of many organic compounds and it is impossible with present analytical means to determine its composition. Although it is not intended to be committed to any particular theory, it is believed that the dextrose reacts with piperidine in the first step of the above synthesis to form the corresponding dextrosylamine which in turn in the second step of the above synthesis rearranges under acid catalysis to form the corresponding Amadori rearrangement products. It is further believed that in the third step of the above synthesis, the Amadori rearrangement products react with proline to produce Strecker degradation of proline. Hodge, J. E. and Rist, C. E., J. Am. Chem. Soc. 75, 316–322 (1953) in an article entitled, "The Amadori Rearrangement Under New Conditions and Its Significance for Non-Enzymatic Browning Reaction," disclose the Amadori rearrangement of glycosylamine derivatives including N-D-glucosylpiperidine and propose that Amadori rearrangement products react with amino acids to produce Strecker degradation of the amino acids in nonenzymatic browning. This article does not disclose the incorporation of such products in an oleaginous composition or the ability of oleaginous compositions containing the specific reaction product of this invention, PPD, to contribute a markedly superior crusty flavor to bakery products.

The concentration of PPD added to oleaginous compositions for use in the preparation of bakery products generally ranges from about 0.5% to about 10% and preferably from about 1.5% to about 5% by weight of the oleaginous composition. Concentrations of PPD are expressed herein on a solvent-free, catalyst-free basis. If the concentration of PPD in an oleaginous composition is less than about 0.5% by weight, little flavor contribution will ordinarily be noticeable in a bakery product prepared from the oleaginous composition. If the concentration of PPD in an oleaginous composition is greater than about 10.0% by weight, bakery products prepared from the oleaginous composition are likely to have a bitter flavor. A concentration of PPD ranging from about 400 p.p.m. to about 1700 p.p.m. based on total flour in the bakery product is preferred.

Oleaginous compositions containing concentrations of PPD greater than 10% by weight are also useful for flavoring bakery products as hereinbefore described. These high concentration PPD oleaginous compositions can be advantageously sold commercially. The buyer can dilute these compositions before use.

The following examples are illustrative of the present invention and are not to be construed in any way as limiting the scope of the invention.

*Example I*

PPD was prepared as follows: 45 gms. (0.25 mole) anhydrous dextrose and 42.5 gms. (0.50 mole) piperidine were refluxed in 50 ml. ethanol with stirring for two hours. A syrupy solution was obtained. 18 gms. (0.3 mole) glacial acetic acid in 25 ml. ethanol were added dropwise with continuous stirring to the syrupy solution over a period of about 30 minutes. About a 170° F. temperature was maintained during the acetic acid addition. A cherry red tinge began to develop immediately upon addition of the acetic acid. After completion of the acetic acid addition, the temperature was maintained at about 170° F. and stirring continued for another 30 minutes. 20 gms. (0.175 mole) proline was then added to the resulting cherry red tinged solution and the 170° F. temperature maintained with stirring for another hour and one-half. The molar ratios of ingredients to dextrose in the preparation of the PPD were as follows: piperidine to dextrose, 2:1; proline to dextrose 0.7:1; glacial acetic acid to dextrose, 1.2:1. The PPD together with ethanol and acetic acid resulting from this synthesis will hereafter be referred to as PPD flavor.

One ml. of the above prepared PPD flavor, including ethanol and acetic acid, was added to 16 gms. of an all soybean oil liquid shortening having an I.V. of about 100 and the PPD flavor was uniformly distributed through the shortening by mixing for about one minute with a spatula. The flavored shortening contained about 3.2% by weight PPD.

Bread dough was then prepared as follows: A conventional brew was prepared from water, liquid sugar (comprising 32% corn syrup with a dextrose equivalent of about 45, 50% sucrose and 18% water by weight), salt, nonfat milk solids, yeast food, compressed yeast, hard wheat flour, anhydrous monocalcium phosphate and calcium propionate. In the preparation of the brew, 70.8 gms. salt, 48.3 gms. non-fat milk solids, 24.2 gms. yeast food, 483.7 gms. hard wheat flour, 4.5 gms. anhydrous monocalcium phosphate and 2.8 gms. calcium propionate were combined; 105.3 gms. crumbled compressed yeast, 1380 gms. water and 181.4 gms. liquid sugar were then added to the previously combined ingredients, the resulting mixture stirred by hand to smoothness and 460 gms. water added to the smooth mixture; the resulting smooth mixture was stirred for two hours with a magnetic stirrer at a temperature of about 85° F., 60.4 gms. liquid sugar was then added, the 85° F. temperature maintained for one-half hour and the resulting fermented mixture refrigerated for ten minutes at 40° F. to stop fermentation. 515 gms. of brew, 17 gms. of the above PPD flavored shortening (16 gms. shortening and 1 ml. of flavor), 430 gms. hard wheat flour and 10 gms. of a water solution of oxidizing agents (containing 3.57 gms. potassium bromate and 0.72 gm. potassium iodate for each 1000 gms. water) were mixed in a Hobart Mixer, No.

C-100, with a dough hook for one minute at No. 1 speed and for 15 minutes at No. 2 speed.

The mixed dough was kneaded and formed into one 454 gms. loaf. The loaf was proofed in a 100° F. high humidity cabinet for 45 minutes and baked in a 425° F. oven for 45 minutes. The loaf contained about 1034 p.p.m. PPD based on flour. In comparison to a control loaf prepared the same but without PPD flavor the PPD-containing loaf had a significantly enhanced crusty flavor.

*Example II*

Bread was made in the same manner as in Example I except that the soybean oil liquid shortening used in the bread preparation contained 1.6% by weight PPD (synthesized as in Example I). The bread contained about 517 p.p.m. PPD based on flour. In comparison to a control loaf prepared the same but without PPD flavor, the PPD-containing loaf had a significantly enhanced crusty flavor.

*Example III*

Two ml. of PPD flavor prepared as in Example I, and including ethanol and acetic acid, was added to 44.6 gms. of an all soybean oil liquid shortening having an I.V. of about 100, and the PPD flavor was uniformly distributed through the shortening by mixing for about one minute with a spatula. The flavored shortening contained about 2.3% by weight PPD.

Bread dough was then prepared as follows: A brew was prepared as in Example I. 1430 gms. of brew, 46.6 gms. of the above PPD flavored shortening (44.6 gms. shortening and 2 ml. PPD flavor) 1195 gms. hard wheat flour and 28 gms. of a water solution of oxidizing agents (containing 3.57 gms. potassium bromate and 0.72 gm. potassium iodate for each 1000 gms. water) were mixed in a Hobart Mixer, No. C-100, with a dough hook for one minute at No. 1 speed and for 15 minutes at No. 2 speed.

The mixed dough was kneaded and formed into five 454 gm. loaves. The loaves were proofed in a 100° F. high humdiity cabinet for 45 minutes and baked in a 425° F. high oven for 45 minutes. The loaves contained about 744 p.p.m. PPD based on total flour. In comparison to control loaves prepared the same but without PPD flavor, the PPD-containing loaves had a markedly superior crusty flavor.

*Example IV*

1.85 ml. of PPD flavor prepared as in Example I, and including ethanol and acetic acid, was added to 60.0 gms. of an all soybean oil liquid shortening having an I.V. of about 100, and the PPD flavor was uniformly distributed through the shortening by mixing with a spatula. The flavored shortening contained about 1.6% by weight PPD.

Chemically leavened rolls were then made as follows: 76.2 gms. dextrose and 61.85 gms. of the above PPD-containing shortening were creamed together in a Hobart Mixer at No. 1 speed for about two minutes. 765.8 gms. white flour, 37.0 gms. delta lactone gluconic acid, 25.0 gms. bicarbonate of soda, 16.0 gms. salt, 14.0 gms. dicalcium phosphate and 3.8 gms. monocalcium phosphate were added to the creamed dextrose and the resulting mixture mixed for about five minutes at No. 1 speed in a Hobart Mixer. To 270 gms. of this mix were added one-half cup milk weighing 120 gms. and one whole egg weighing 48 gms. and these ingredients were mixed in a Hobart Mixer at No. 1 speed for about five minutes. The mixed dough was formed into 15 rolls of assorted twisted shapes having weights ranging from about 25 gms. to about 35 gms. The rolls were baked in a 425° F. oven for 20 minutes. The rolls contained 1293 p.p.m. PPD based on flour. In comparison to control rolls prepared the same but without PPD flavor, the PPD-containing rolls had a significantly enhanced crusty flavor.

In Example 1 similar results are obtained when glycerine, propylene, glycol, triacetin and acetic acid are employed as solvents for PPD synthesis instead of ethanol.

Likewise, similar results are obtained when phosphoric, boric, malonic, propionic, benzoic, succinic, citric, glutamic, tartaric and fumaric acids are substituted for acetic acid as a catalyst for PPD synthesis in Example I.

The foregoing description has been presented describing certain operable and preferred embodiments of this invention. Other variations will be apparent to those skilled in the art.

What is claimed is:

1. The method of preparing a flavored oleaginous composition which comprises the steps of adding the reaction product of piperidine, proline and dextrose to an oleaginous composition and uniformly distributing the reaction product through the oleaginous composition; said reaction product being prepared by a process comprising the steps of (1) reacting piperidine with dextrose at a temperature ranging from about 140° F. to about 250° F. over a time period ranging from 1.5 to 2.5 hours to form a syrupy solution, the mole ratio of piperidine to dextrose ranging from 1:4 to 2:1, (2) adding to the syrupy solution obtained from step (1) over a time period ranging from 15 minutes to 45 minutes with continuous stirring an acidic catalyst selected from the group consisting of acetic, phosphoric, boric, malonic, propionic, benzoic, succinic, citric, glutamic, tartaric and fumaric acids, to form a cherry red tinged solution, the mole ratio of acidic catalyst employed in this step to dextrose employed in step (1) ranging from 1:10 to 2.5:1, and (3) reacting the solution obtained from step (2) with proline at a temperature generally similar to the temperature employed in step (1) for a time period ranging from one to two hours, the mole ratio of proline employed in this step to dextrose employed in step (1) ranging from about 1:10 to about 1.5:1.

2. The method of claim 1 wherein in step (1) of the preparation of the reaction product, ethanol is employed as a reaction solvent and reaction is carried out at the reflux temperature; and wherein in step (2) of the preparation of the reaction product, acetic acid is employed as the acidic catalyst, and, after the addition of the acetic acid, heating at a temperature generally similar to the temperature employed in step (1) for about one-half hour to ensure practical completion of reaction.

3. The method of claim 2 wherein the reaction product added to and uniformly distributed through the oleaginous composition amounts to about from 0.5% to about 10% by weight of the oleaginous composition.

4. The flavored oleaginous composition, for use in supplying a significantly enhanced crusty flavor to bland or lightly flavored bakery products, obtained by the method of claim 1.

5. A bread composition containing the flavored oleaginous composition obtained by the method of claim 2 whereby a significantly enhanced crusty flavor is supplied to the bread composition.

References Cited

UNITED STATES PATENTS 3,060,031 10/1962 Moriarty et al. _____ 99—90
3,274,221 9/1966 Radlove _____ 99—118 X A. LOUIS MONACELL, *Primary Examiner.*

L. M. SHAPIRO, *Assistant Examiner.*